United States Patent [19]
McLauchlan et al.

[11] Patent Number: 4,533,242
[45] Date of Patent: Aug. 6, 1985

[54] RANGING SYSTEM WHICH COMPARES AN OBJECT-REFLECTED COMPONENT OF A LIGHT BEAM TO A REFERENCE COMPONENT OF THE LIGHT BEAM

[75] Inventors: John M. McLauchlan, Pasadena; John AuYeung, Alhambra; Eldred F. Tubbs, Claremont; Willis C. Goss; Demetri Psaltis, both of Altadena, all of Calif.

[73] Assignee: The United States of America as represented by the Administrator of the National Aeronautics and Space Administration, Washington, D.C.

[21] Appl. No.: 425,202

[22] Filed: Sep. 28, 1982

[51] Int. Cl.³ .............................................. G01C 3/08
[52] U.S. Cl. ..................................... 356/5; 343/13 R
[58] Field of Search ......................... 356/5; 343/13 R

[56] References Cited
U.S. PATENT DOCUMENTS

| | | | |
|---|---|---|---|
| 2,968,987 | 1/1961 | Knopow | 356/5 |
| 3,019,690 | 2/1962 | Hildebrand et al. | 356/5 |
| 3,914,052 | 10/1975 | Wiklund | 356/5 |
| 4,451,146 | 5/1984 | Grage et al. | 356/5 |

*Primary Examiner*—S. C. Buczinski
*Attorney, Agent, or Firm*—Paul F. McCaul; John R. Manning; Thomas H. Jones

[57] ABSTRACT

A system is described for measuring the distance to an object by comparing a first component (18) of a light pulse that is reflected off the object (14), with a second component (20) of the light pulse that passes along a reference path (26) of known length, which provides great accuracy with a relatively simple and rugged design. The reference path (26) can be changed in precise steps so that is has an equivalent length approximately equal to the path length of the light pulse component that is reflected from the object. The resulting small difference in path lengths can be precisely determined by directing the light pulse components into opposite ends of a detector (70) formed of a material that emits a second harmonic light output at the locations where the opposite-going pulses pass simultaneously across one another.

5 Claims, 7 Drawing Figures

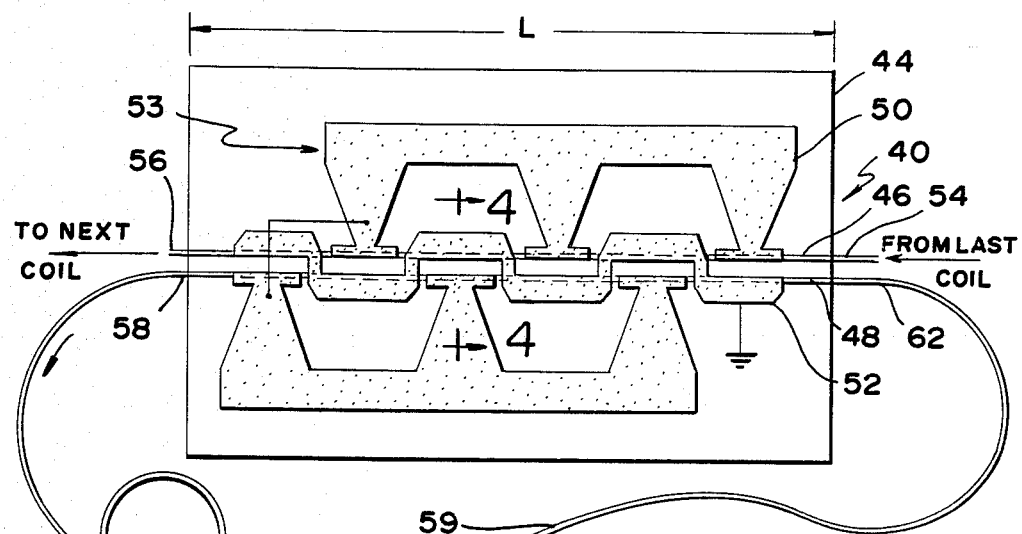
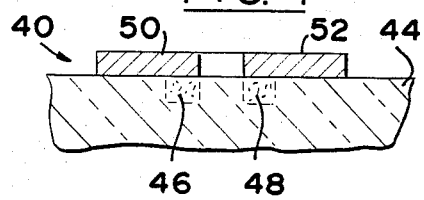
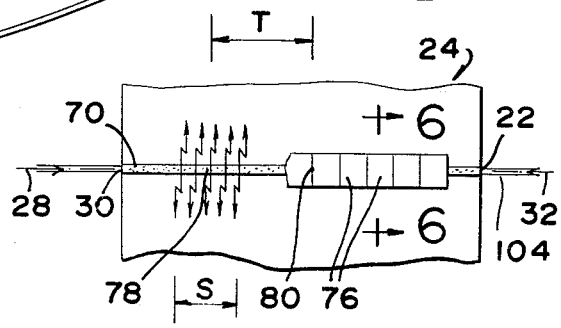
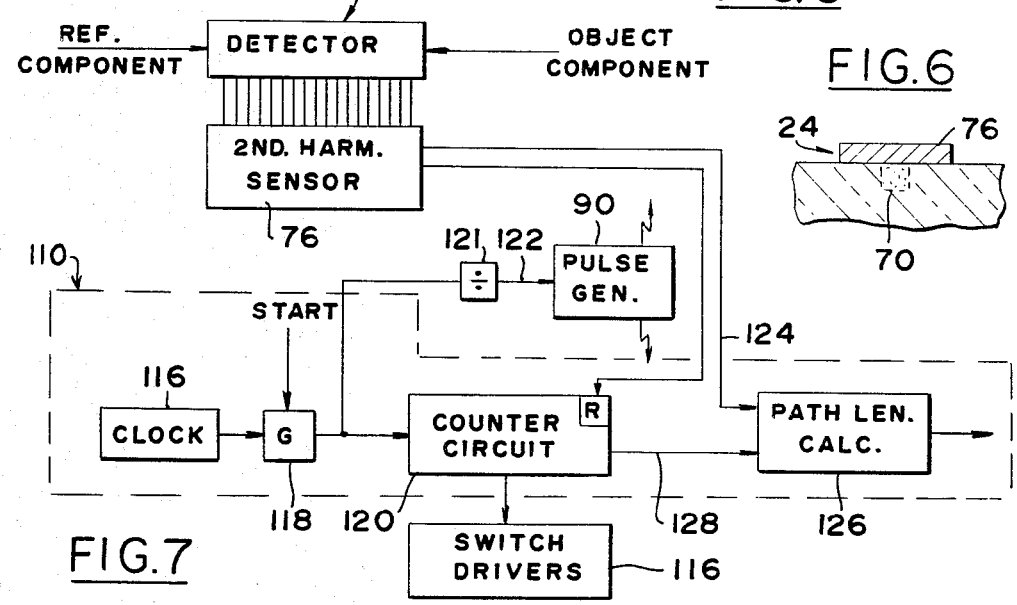

RANGING SYSTEM WHICH COMPARES AN OBJECT-REFLECTED COMPONENT OF A LIGHT BEAM TO A REFERENCE COMPONENT OF THE LIGHT BEAM

ORIGIN OF THE INVENTION

The invention described herein was made in the performance of work under a NASA Contract and is subject to the provisions of Section 305 of the National Aeronautics and Space Act of 1958, Public Law 85-568 (72 Stat. 435; 42 USC 2457).

BACKGROUND OF THE INVENTION

The range of an object can be determined by ranging techniques involving the reflection of light from the object, with the range determination based on parallax, interferometry, or light time of flight. Parallax techniques require a long precision reference base line to obtain high accuracy, and require demanding image feature correlation processing to enable automatic range determination. Interferometric devices provide micron-level accuracy, but are very sensitive to disturbances and are complicated. Time of flight devices, wherein the time required for return of a light pulse directed at the object, have been limited in accuracy by the difficulty of constructing very high frequency precision counters and very fast and repeatable detectors. A ranging system which could provide automatic and precise ranging in a relatively simple and rugged apparatus, would be of considerable value.

SUMMARY OF THE INVENTION

In accordance with one embodiment of the present invention, a ranging system is provided which can accurately determine the range of an object using relatively simple and rugged equipment. The system includes a light source which generates a pair of components of a brief light pulse, which reflects a first light pulse component off an object and into a comparing apparatus, and which directs a second light pulse component through a reference path of known length to the comparing apparatus. The system forms a reference optical path that can be varied in length so that its equivalent length almost equals the path of the object-reflected light component. This permits a comparing apparatus to be used, which need measure only slight differences in the lengths of the paths of the light pulse components.

The reference path can include a light transmitting delay device having a group of delay elements connected in series, with each element having alternate delay paths along which light can pass. The first delay path of each element may be short and may be equal for all elements, while the second delay path of each element may be longer and each element may have a different second delay path. A switch in each element can be operated to pass light along either of the delay paths, so that the reference path can be made progressively longer by switching in more and longer ones of the second delay paths.

The comparing apparatus which compares the object-reflected component of the light pulse and the reference component, can detect the difference in path lengths without electronically counting time differences. This can be accomplished by using a detector of the type that is formed of material that emits, in a lateral direction, a second harmonic of light that passes in opposite directions simultaneously through any portion of the material.

The novel features of the invention are set forth with particularity in the appended claims. The invention will be best understood from the following description when read in conjunction with the accompanying drawings.

BRIEF DESCRIPTION OF THE DRAWINGS

FIG. 3 is a plan view of a delay device of the system of FIG. 1.

FIG. 4 is a view taken on the line 4—4 of FIG. 3.

FIG. 5 is a plan view of a detector of the system of FIG. 1.

FIG. 6 is a view taken on the line 6—6 of FIG. 5.

FIG. 7 is a more complete block diagram view of a portion of the system of FIG. 1.

DESCRIPTION OF THE PREFERRED EMBODIMENTS

Figure 1:
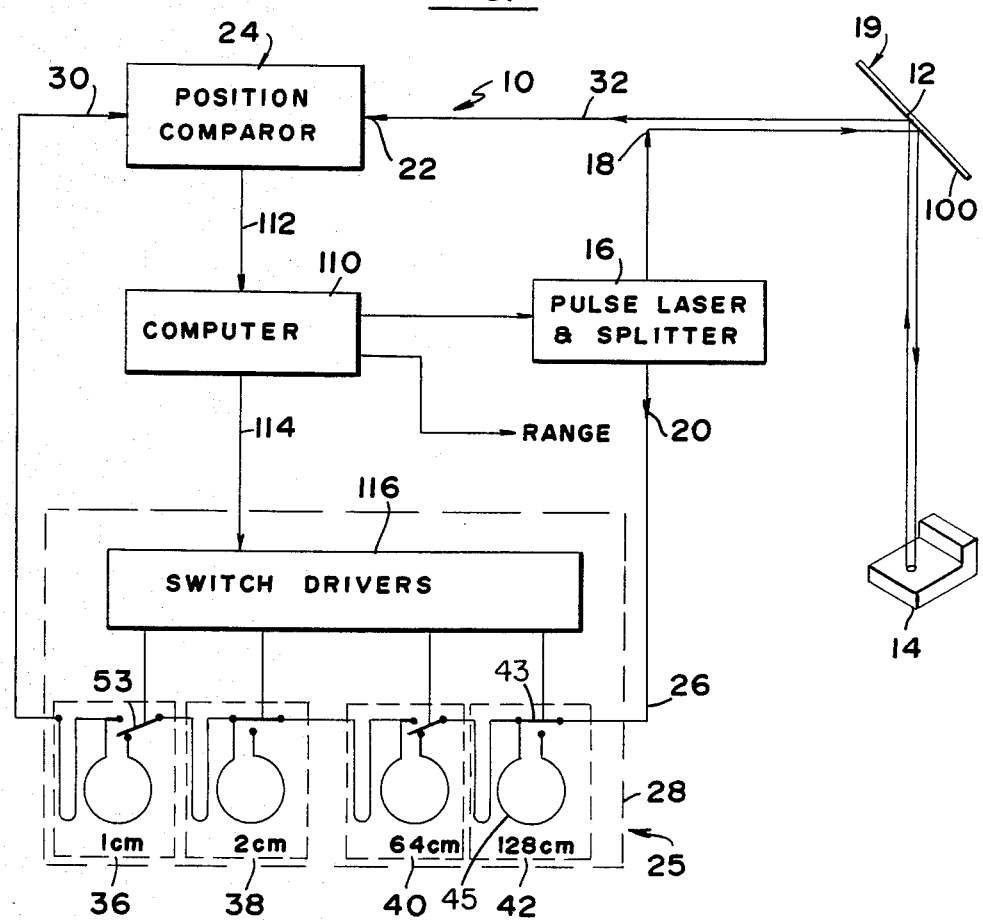
FIG. 1 is a block diagram view of a ranging system constructed in accordance with the present invention.

FIG. 1 illustrates a ranging system 10 which can measure the distance between a location such as 12 on the system and an object 14. The system includes a laser pulse source 16 which generates a train of brief light pulses and which delivers two components of the light pulses, indicated by arrows 18, 20, for passage along different paths. A first or object component 18 is directed by a first optical system 19 towards the object 14 so it can be reflected from the object and enter a first input 22 of a position comparer 24. The other, or reference component 20 of each light pulse is directed by another optical system 25 to pass along a reference path 26 which includes a variable delay device 28, and into a second input 30 of the position comparer. The position comparer 24 compares the length of the path 32 of the object component, in its passage from the pulse source 16 to the input 22 of the position comparer, with the length of the reference path 26 which extends from the pulse source 16 to the other comparer input 30.

The position comparer 24 can determine the difference between the object path 32 along which the object component 18 travels, and the reference path 26 along which the reference component 20 travels. In accordance with one aspect of the present invention, the variable delay device 28 is included to vary the reference path so it is almost equal to the object component path 32. This enables the position comparer 24 to operate by measuring only slight differences in the object and reference path lengths.

Where the reference and object component paths lie in the same medium such as air, then the two light pulse components will simultaneously reach the position comparer 24 when the object and reference path lengths are equal in mechanically measurable length. However, where some or all of the reference path contains a medium of different index of refraction, such as of an optic fiber, then the light pulse components will simultaneously reach the comparer only if the mechanically measurable reference path length times the index of refraction of its material, equals the length of the object path in air. In the present description, the equivalent reference path length is discussed; that is, the path that provides the same time delay therealong as would be obtained by passing the reference component through air or other medium in which the object component moves. Of course, it is possible to use only air along the reference path, as by directing light solely by mirrors, although the use of optical fibers makes the device much more rugged.

The variable delay device 28 includes a group of 5 elements such as 36-42 that can be individually switched to add a predetermined distance to the minimum reference path. The additional path lengths are preferably in a geometric progression, as where a first element 36 provides a one centimeter increase in equivalent path length (when switched on), a second element 38 provides a 2 cm increase, and progressive elements provide double the increase in equivalent path length until the last two elements 40, 42 provide 64 cm and 128 cm additional increases. In element 42, a line 43 provides a minimal path length, while a line 45 provides a 128 cm equivalent path length. With such an arrangement, the equivalent path length can be increased from a minimal value in increments of one cm, with total increases of 0 to 255 cm. It may be noted that the variable delay or path length device 28 could be placed in series with the object path instead of the reference path, to vary the object path length to equal a long fixed reference path length, although this generally is of no advantage. Thus, any reference to varying of the reference path length means varying it relative to the object path length, which can be accomplished by varying either (or both) of them.

FIGS. 3 and 4 illustrate one of the delay elements such as 40 that increase the path length. The element 40 includes a chip of block 44 of semiconductor material such as lithium niobate (LiNb) into which titanium (Ti) has been diffused. This can be accomplished by depositing titanium onto the surface of the block and then heating the block in an oxidizing atmosphere to diffuse the titanium, to form a narrow region of $TiLiNbO_3$. Two regions 46, 48 are formed in the block, along which light can be conducted in the manner of a waveguide. A pair of electrodes 50, 52 are formed over the block and connected together to serve as a switch 53. When a voltage is applied to the electrodes, the index of refraction of the material between the waveguides 46, 48 changes and permits the coupling of light from one to the other. This type of optical switch device has been known.

When no voltage is applied to the electrodes 50, 52, light entering an input 54 of the element passes straight through the first waveguide 46 and directly exits through the output 56 of the device. The equivalent length of the waveguide such as 46 may be 5 mm (where the actual length L is 3.5 mm and the index of refraction is 1.4). However, when a proper voltage is applied to the electrodes, light entering the input 54 and which begins passing along the first waveguide 46, is coupled to the other waveguide 48 and exits through another output 58. The light then passes through a light conductor 59 to pass along a path 60, which may be formed by an optic fiber where a considerable delay is required, and with the other end of the path 60 coupled to a second input 62 of the element. The light begins to pass along the second waveguide 48 and is coupled to the first one 46 to pass out of the element at the output 56. Thus, when no voltage is applied to the electrodes, the element has a first equivalent delay path such as 5 mm long. However, when the voltage is applied, the light passes along a second delay path whose equivalent in air equals twice the length L plus the length of the path 60, all times the index of refraction.

As mentioned above, the variable delay device 28 (FIG. 1) enables a position comparer 24 to be used which measures only small differences in equivalent path length between the object and reference components of the light pulse. In some prior art ranging systems, the difference between the object and equivalent reference component paths were large, and an electronic counter was used to determine the difference. The counter was started when the light pulse was first emitted or after a reference pulse was detected that travelled a short distance. The counter was stopped when the object-reflected component was detected. The time represented by the count times the speed of light equalled the difference in path lengths, and therefore twice the distance of the object plus a constant. Since light travels in vacuum at 0.3 mm per picosecond ($10^{-12}$ second), the attainment of ranging accuracy within a few millimeters required an electronic counter which could accurately count time periods within several picoseconds. Also, the transducer which detects the reference and object-reflected pulse components and generates an electrical signal upon the detection to start or stop the counter, would have to operate with a uniformity within several picoseconds. Counters and transducers which can operate with such speed and accuracy are very difficult to construct, especially if they are to be rugged enough for field use.

In accordance with another aspect of the invention, applicant's position comparer 24 does not have to measure a difference in time of arrival of two light-beam components or the like. Instead, the comparer directly measures the difference in equivalent path length at an instant and at a position at which the light pulse components are simultaneously passing across one another. The position comparer or detector assembly 24 can have the construction shown in FIGS. 5 and 6. The assembly includes a detector 70 formed of a material with non-linear light transmission properties, so that when light passes through the material it emits a second (plus higher) harmonics of the light. A block of LiNb in which a narrow region of $TiLiNbO_3$ has been formed, as described above for the light switch of FIGS. 3 and 4, can be used. When light travels in only one direction through the detector 70, the second harmonic emission is not detected at the side of the detector. However, when light travels in opposite directions through the detector 70, as by directing two light beam components into its opposite ends, a second harmonic of light is emitted perpendicular to the length of the detector, and can be detected by a photocell placed at the side of the detector 70. Such second harmonic emissions from oppositely moving pulses have been observed in such $TiLiNbO_3$ material in the prior art, but it is not believed that it has been used to compare path lengths as in ranging.

The object-reflected component of the light pulse, which is moving along the path 32, is directed into one end 22 of the detector 70. The reference component, which travels along the path 28, is directed into the opposite end 30. If the equivalent reference path length is close enough to the object component path length, the object and reference components of the light pulse will pass simultaneously across one another as they travel within the detector 70. This fact can be sensed by photodetectors such as 76 that lie beside the detector 70. The particular location of second harmonic emission along the length of the detector 70, is a measure of the difference in equivalent path lengths of the two light pulse components.

In one simplified example, the light pulse components each have a length S and the center of the area where they pass across one another is at the point 78. If the distance T between the center 80 of the detector and the central emission point 78 is one cm, and the index of refraction n of detector material is 1.4, then it indicates that the object component path is longer than the reference path by 2 nT or 2.8 cm. Trains of pulses can be generated that have a 3 dB duration of 10 picoseconds by use of a synchronously pumped mode locked laser diode. However, this produces a high repetition rate such as 500 MHz. Pulses can also be produced by direct modulation of a laser diode, to enable production of pulses at any repetition rate from 0 to about 2.5 GHz ($2.5 \times 10^9$), although the pulses then have a duration of about 28 picoseconds. A 28 picosecond pulse time results in a pulse length of about 8 mm in air although the length increases by dispersion effects. By using a detector 70 of a length of about one cm, the entire length S of second harmonic emissions can be detected, and the center of the emissions at 78 can be determined. This can be accomplished by using a row of closely spaced photodetectors 76, such as a CCD (charge coupled diode) device in the form of a linear array that extends along the length of the detector 70. With that length of detector 70, a delay device 28 (FIG. 1) which can change the equivalent reference path length by increments of 1 cm enables the shifting of the point where the object and reference pulse components cross to lie on the detector 70.

Figure 2:
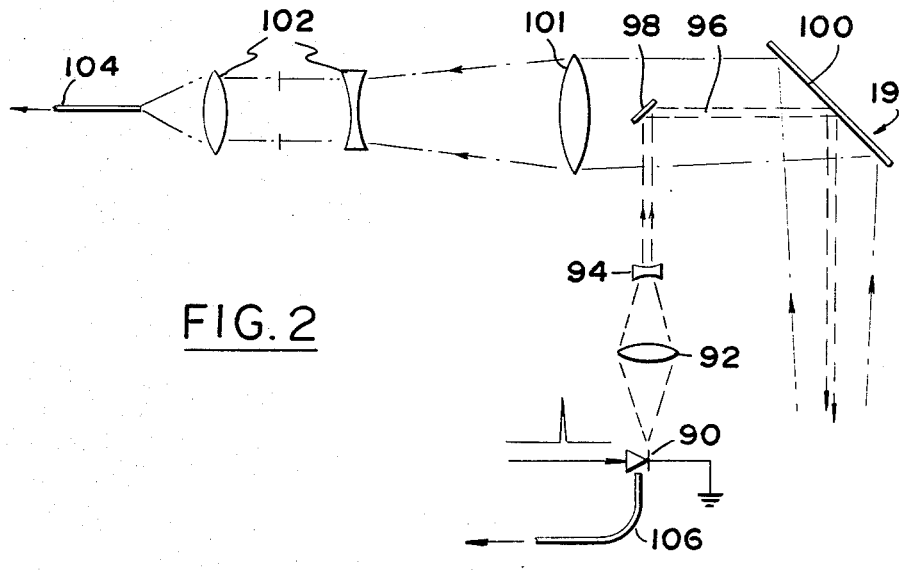
FIG. 2 is a schematic diagram of a portion of the system of FIG. 1.

As shown in FIG. 2, the pulse laser and splitter device 16 of FIG. 1 can be formed by a laser diode 90 to which current pulses are applied to cause the emission of brief pulses of light of a very narrow frequency band. A large portion of the emitted light is concentrated by a pair of lenses 92, 94 to produce a narrow beam 96 that is reflected by a pair of mirrors 98, 100 at the object. Light reflected from the object is directed by the reflector 100 towards a concentrating lens 101 and through additional lenses 102, to concentrate the reflected light onto an end of an optical fiber 104. A small amount of light from the laser diode 90 enters another optic fiber 106 that extends along the reference path. A laser diode 90 can be chosen which emits infrared light, so the second harmonic thereof is in the visible range.

FIG. 1 shows a computer 110 which has an input 112 connected to the position comparer or detector assembly 24, and which has an output 114 connected to switch drivers 116 that deliver pulses to switches such as 53 that connect the second or longest delay paths of selected delay elements in series with the reference path. FIG. 7 is a more detailed diagram of the computer 110. The computer 110 can be represented by a circuit that includes a clock 116 and a gate 118 that passes clock pulses to a counter circuit 120. The clock pulses are divided by a divider 121 and pass along a line 122 to the pulse generator such as the laser diode 90, to generate a light pulse at every several counts of the other circuit 120. After a predetermined count is reached which represents the minimum possible object component path length of path (32), the counter circuit 120 operates the switch drivers 116 to progressively increase the reference path length.

Initially, the equivalent reference path length equals the minimum object component path length. Thus, if a second harmonic were initially sensed by the detector assembly 24, then it would be known that the object path length equals the equivalent reference path length plus or minus a small amount proportional to the shift of the area of second harmonic emissions from the center of the length of the detector. However, if the detector assembly 24 does not detect a second harmonic, then the counter circuit 120 operates the switch drivers 116 to increase the equivalent reference path length by a minimum increment such as one centimeter prior to the next light pulse component passing therethrough. If the detector assembly again does not make a detection, the reference path length is increased by another increment, etc.

When the second harmonic sensors 76 of the detector assembly 24 finally sense a second harmonic emission, then this fact is signaled by delivering a signal over line 124 to a path length calculating circuit 126. An output on line 128 from the counter circuit is also delivered to the circuit 126 to indicate how long the reference path was for the pulse passing therethrough which resulted in a detection. The circuit 126 calculates the object component path as equal to the length of the reference path (times the ratio of indexes of refraction of air to optic fiber material), plus or minus twice the distance T (FIG. 5) by which the center of second harmonic emissions deviates from the center of the detector (times the ratio of indexes of refraction of air to detector material) all times the speed of light in air. The object range equals this minus a constant representing the portion of the object path length that lies within the instrument.

The reference path can vary because of temperature changes which change the index of refraction of the optic fiber through which the reference beam passes, or which changes the wavelength of light produced by the laser diode. Such variations in refractive index or in light frequency, affect the length of the path taken by light that passes along a slightly zig zag path along the optic fiber. Variations in the travel time due to thermal changes can be calculated. For a GaAlAs semiconductor laser and a fused silica waveguide, there is a change in the path length of +0.75 mm per 100 meters per °C. increase in temperature. The change in reference pathlength due to changes in the wavelength output of the laser diode is about −0.75 mm per 100 meters per °C. increase in temperature. Thus, for a GaAlAs semiconductor laser and a fused silica waveguide, the temperature effects largely cancel one another, to produce a high stability in path length. Of course, temperature-caused changes in path length can be compensated for in the calculations of ranging distance.

Thus, the invention provides a method and apparatus for measuring the range of an object, which provides high accuracy using relatively simple and rugged equipment. This can be accomplished by passing components of a light pulse so one component is reflected off the object and directed to a detector, and the other component passes through a reference path of known length to the same detector, and by using a reference path which can be varied in equivalent length so that the detector need measure only small differences in path length. The detector can be of the type that indicates the location where the two pulse components pass across one another, to thereby permit precise measurements of the difference in path lengths, without the need for an electronic counter or a photodetector to start or stop the counter. The reference path can include a device which has numerous elements connected in series, with each element having a first short path, a second longer path with the second paths of different elements being different, and a switch to enable selection of which path length is to be utilized for each element. The detector assembly can include a narrow length of non-linear light carrying material and a linear array of photodetectors such as charge coupled diodes, for indicating the boundaries or center of the location where the pulse components pass across one another.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A distance measuring system comprising:
    means for generating a pair of components of a pulse of light, including an object component and a reference component;
    a detector assembly including a detector with opposite ends and a side, said detector formed of a material that produces a harmonic light output that can be detected at a side of the detector when components of a light pulse that are directed into the opposite ends of the detector pass simultaneously in opposite directions through at least a portion of the detector, said assembly also including means for indicating the position of harmonic light output from the detector;
    means for directing the object component toward an object and directing light reflected from the object into a first end of the detector; and
    means for directing the reference component along a reference path of known length and into the second end of the detector to determine the length of the object component path by the precise position at which it crosses the reference component path.

2. The apparatus described in claim 1 wherein:
    said means for directing the reference component includes means for varying the reference path length in precisely known steps.

3. In a ranging system which includes a source that generates object and reference components of a brief light pulse, a first optical system that reflects the object component off an object-to-be-ranged and directs the reflected light to a comparing apparatus, and a second optical system that passes the reference component along a reference path of known equivalent length to the comparing apparatus, the improvement wherein:
    said second optical system includes means for varying the reference optical path to an equivalent length almost equal to the path of the object beam component, whereby the comparing apparatus has to measure only slight differences in the beam component path lengths;
    said means for varying the reference path includes a plurality of light transmitting elements, each having two delay paths along which light can pass, including a short length delay path and a longer length delay path, and also includes switch means operable to pass light along either of the delay paths, said light transmitting elements being connected in series.

4. The improvement described in claim 3 wherein:
    the second delay paths of said devices vary in length in a geometric progression with each of a plurality of second delay paths having a length twice that of a next shorter second delay path.

5. In a ranging system which includes a source that generates object and reference components of a brief light pulse, a first optical system that reflects the object component off an object-to-be-ranged and directs the reflected light to a comparing apparatus, and a second optical system that passes the reference component along a reference path of known equivalent length to the comparing apparatus, the improvement wherein:
    said second optical system includes means for varying the reference optical path to an equivalent length almost equal to the path of the object beam component, whereby the comparing apparatus has to measure only slight differences in the beam component path lengths;
    said comparing apparatus includes a detector with opposite ends of a material that generates a second harmonic light output from light beams that pass simultaneously in opposite directions through the material and means for detecting said second harmonic light at a side of said material;
    said first and second optical systems are positioned to direct said beam components into the opposite ends of said detector; and
    said means for detecting said second harmonic light includes a linear array of photodetectors for detecting light at all locations along said detector where the components pass simultaneously across each other to enable determination of the center or other point of the area of second harmonic emission.

* * * * *